US011843453B2

(12) United States Patent
Anand et al.

(10) Patent No.: US 11,843,453 B2
(45) Date of Patent: Dec. 12, 2023

(54) TIME SYNCHRONIZATION IN PASSIVE OPTICAL NETWORKS

(71) Applicant: CISCO TECHNOLOGY, INC., San Jose, CA (US)

(72) Inventors: Prashant Anand, Bangalore (IN); Ashok Chandre Gowda, Bangalore (IN); Ajay Sandhir, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 17/224,532

(22) Filed: Apr. 7, 2021

(65) Prior Publication Data
US 2022/0329337 A1  Oct. 13, 2022

(51) Int. Cl.
*H04J 3/06* (2006.01)
*H04Q 11/00* (2006.01)

(52) U.S. Cl.
CPC .......... *H04J 3/0667* (2013.01); *H04J 3/0644* (2013.01); *H04Q 11/0067* (2013.01); *H04Q 2213/1336* (2013.01); *H04Q 2213/13361* (2013.01)

(58) Field of Classification Search
CPC ...... H04J 3/0667; H04J 3/0655; H04J 3/0673; H04J 3/0644; H04J 3/0664; H04J 3/0661; H04J 3/067; H04J 3/0658; H04J 3/0638; H04J 3/0641; H04J 3/065; H04J 3/0647; H04J 3/0652; H04J 3/0697; H04B 10/27; H04Q 11/0067; H04Q 2213/1336; H04Q 2213/13361; H04Q 11/04
See application file for complete search history.

(56) References Cited

U.S. PATENT DOCUMENTS

| 8,718,482 | B1 | 5/2014 | Roberts et al. |
| 2009/0328190 | A1* | 12/2009 | Liu .......................... H04L 65/80 726/14 |
| 2011/0182588 | A1 | 7/2011 | Wojtowicz |
| 2012/0301147 | A1 | 11/2012 | Zhao et al. |
| 2014/0177653 | A1* | 6/2014 | Tzeng ................... H04J 3/0673 370/503 |
| 2014/0226984 | A1* | 8/2014 | Roberts .............. H04Q 11/0001 398/66 |
| 2015/0358700 | A1 | 12/2015 | Lee et al. |
| 2020/0120408 | A1 | 4/2020 | Boyd et al. |
| 2022/0400083 | A1* | 12/2022 | Chandrasekaran ... H04L 47/562 |

* cited by examiner

*Primary Examiner* — Hibret A Woldekidan
(74) *Attorney, Agent, or Firm* — Lee & Hayes, P.C.

(57) ABSTRACT

This technology allows time synchronization in passive optical networks ("PON"). A first Ethernet device timestamps and transmits a packet to a second Ethernet device via the PON. The first Ethernet device transmits the packet to a small form-factor pluggable ("SFP") device within the PON and connected to the first Ethernet device. The SFP device determines a transmission time to a second SFP device and modifies a correction field ("CF") of the packet by subtracting an ingress time and the transmission time from the CF. The packet is transmitted to the second SFP device, which modifies the CF by the addition of an egress time. The modified CF value represents the real-time transmission delay incurred in the SFP devices. The packet is transmitted to a second Ethernet device to synchronize a clock using the timestamp and the CF value in accordance with the PTP/IEEE-1588 standard.

19 Claims, 6 Drawing Sheets

TIME SYNCHRONIZATION IN PASSIVE OPTICAL NETWORKS

TECHNICAL FIELD

This disclosure relates to time synchronization in passive optical networks with asymmetrical uplink and downlink transmissions.

BACKGROUND

In LTE, LTE-A, LTE-Pro, and 5G wireless technologies, transport networks use time division duplex ("TDD") to achieve time of day ("ToD") synchronization. Time and phase synchronization is necessary to prevent interference between uplink and downlink transmissions and is a critical component of network performance.

Transport networks may use Internet Protocol over Ethernet over Fiber ("IPoEoF") infrastructures as a disaggregated architecture for transmissions, where the transmissions are across passive optical networks ("PON"). A PON is a fiber optic telecommunication-based technology that provides broadband network access in a point to multi-point topology. PONs have asymmetrical uplink and downlink transmissions. Different bandwidths may be assigned for uplink and downlink transmissions, typically with faster bandwidths for downlink transmissions. Devices within a conventional PON, such as an optical line terminal ("OLT") device and an optical network unit ("ONU") device, use uplink scheduling protocols requiring a grant to send a transmission. The ONU device requests a grant from the OLT device to send a packet transmission. The grants are issued based on a timing cycle. If a packet transmission is not aligned within a current timing cycle, delay and jitter are introduced in the PON. Downlink scheduling is not required in a point to multi-point topology.

PONs comprise sources of variable and fixed propagation delays. Variable delays occur within each of the OLT and ONU devices based on processing and queuing that may be associated with network congestion. Fixed or constant propagation delays occur between the OLT device and each ONU device within the PON.

Conventional solutions for time and phase synchronization across a PON have limited timing accuracy because devices in the PON do not have access to the ToD clocks outside the PON, the PON has asymmetrical uplink and downlink transmissions, and the PON experiences variable delays and jitter within the OLT and ONU devices.

DETAILED DESCRIPTION

Overview

Figure 1:
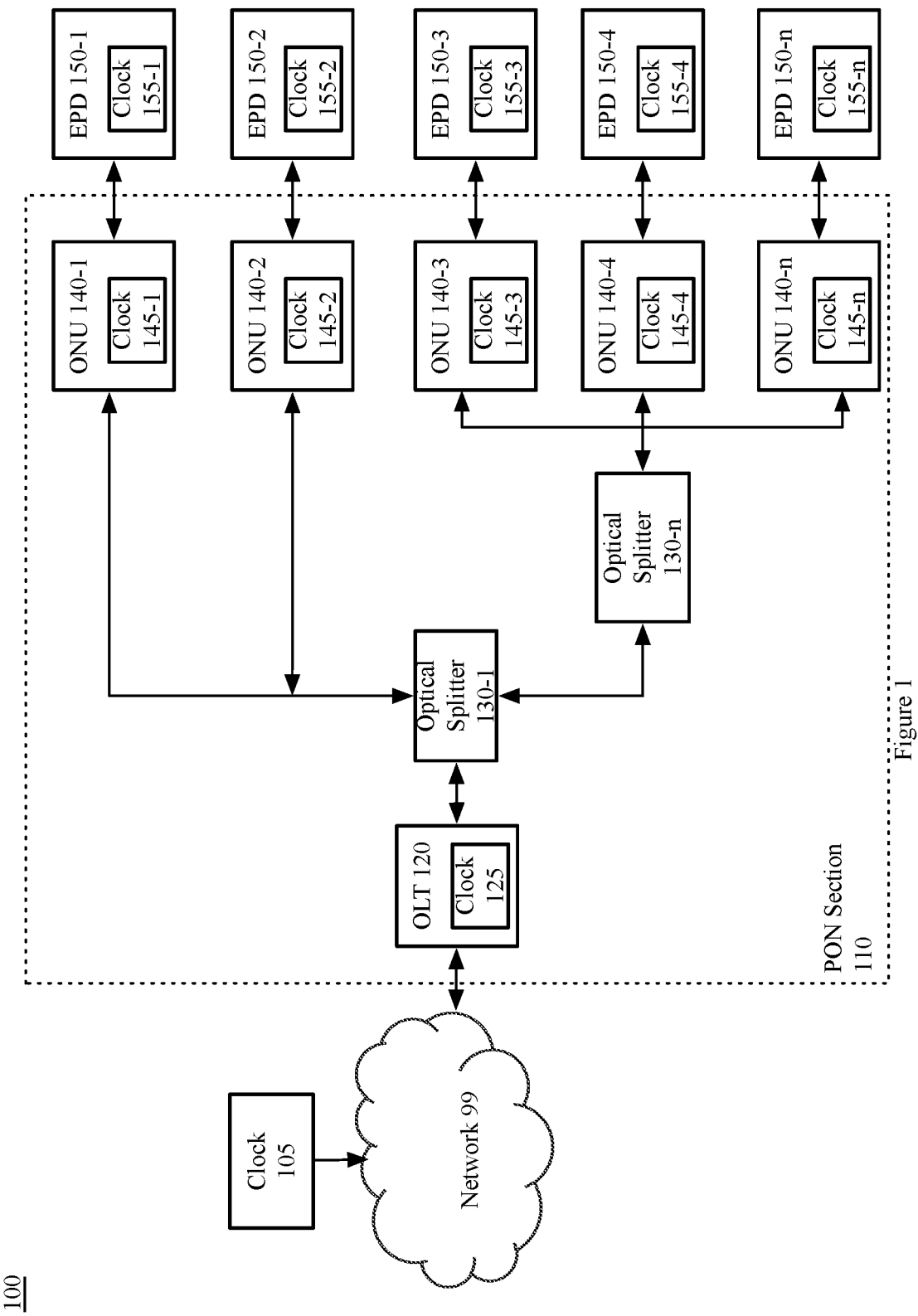
FIG. 1 is a block diagram depicting a passive optical network system, in accordance with certain examples.

The present technology allows time synchronization in disaggregated passive optical networks ("PON") with asymmetrical uplink and downlink transmissions, constant and variable transmission delays, and variable jitter.

In LTE, LTE-A, LTE-Pro, and 5G wireless technologies, transport networks may use Internet Protocol over Ethernet over Fiber ("IPoEoF") infrastructures as a disaggregated architecture for transmissions, where the transmissions are across passive optical networks ("PON"). A PON is a fiber optic telecommunication-based technology that provides broadband network access in a point to multi-point topology. Devices within the PON, such as an optical line terminal or termination ("OLT") device and optical network unit ("ONU") devices, transmit fiber optic signals in upstream and downstream directions. PONs comprise a single OLT device and a plurality of ONU devices. Optical splitters within the PON split the fiber optic signal into 32, 64, or 128 paths. In an example disaggregated PON, each of the OLT and ONU devices comprise of an Ethernet device, such as a router, and a small form-factor pluggable ("SFP") device, with the Ethernet devices being external to the PON and the SFP devices being internal to the PON.

Each of the Ethernet devices are in communication with a time of day ("ToD") clock, such as a master clock and a slave/client clock, and are time synchronized in accordance with the PTP/IEEE-1588 timing standard. Within the PON, each of the OLT and ONU devices are time synchronized with local ToD clocks. However, the ToD clocks of the OLT and ONU devices of the PON are not time synchronized with the ToD clocks of the Ethernet devices. The devices within the PON do not have access to the ToD clocks of the Ethernet devices. As such, any timestamping by the Ethernet devices will not be time synchronized with timestamping by devices within the PON.

For time synchronization across a PON, variable delays in each of the OLT and ONU devices are modeled as a constant delay that is determined and updated in near real-time. The variable delay in each of the OLT and ONU devices is caused by one or more of a processing delay, a queuing delay, or any other type of delay that may be incurred in a PON. Variable delays may be incurred as a result of network congestion. Fixed or constant propagation delays occur between the OLT device and each ONU device within the PON.

A first Ethernet device timestamps a precision time protocol ("PTP") packet. The PTP packet is a PTP synchronization message in accordance with the PTP/IEEE-1588 timing standard. The timestamp is a time that the packet is transmitted from the first Ethernet device to a second Ethernet device. The first Ethernet device transmits the PTP packet as an electrical signal to the second Ethernet device across the PON. To transmit the PTP packet to the second Ethernet device, the first Ethernet device transmits the PTP packet to a first SFP device within the PON that is connected to the first Ethernet device. The first SFP device is functioning as an OLT device of the PON.

The first SFP device timestamps an ingress time of the PTP packet to the first SFP device. The first SFP device modifies a correction field of the PTP packet by subtracting the ingress time from the correction field. The first SFP device determines the transmission time or ranging delay to a second SFP device. The second SFP device is functioning as an ONU device of the PON. In the present example, the first SFP device is determining the transmission time to a particular second SFP device as the PON comprises numerous second SFP devices. In real-time, the first SFP device is transmitting packets to numerous SFP devices within the PON. The first SFP device determines the transmission time to the particular second SFP device as the transmission time varies based on the distance from the first SFP device to each of the second SFP devices. The first SFP device modifies the correction field of the PTP packet by subtracting the transmission time from the previously stored value in the correction field. In an alternate embodiment, the second SFP device determines the transmission time and subtracts the transmission time from the previously stored value in the correction field.

The first SFP device transmits the PTP packet to the second SFP device. To transmit the PTP packet, the first SFP device converts the PTP packet from the electrical signal to a fiber optic signal. The first SFP device transmits the PTP packet to the second SFP device via one or more optical splitter devices.

The second SFP device timestamps an egress time of the PTP packet from the second SFP device. The second SFP device modifies the correction field by adding the egress time to the previously stored value in the correction field. The new value of the correction field represents the transmission delay incurred in the SFP devices within the PON.

The second SFP device transmits the PTP packet to the second Ethernet device. The second SFP device converts the PTP packet from a fiber optic signal to an electrical signal for transmission to the second Ethernet device.

The second Ethernet device synchronizes a clock in communication with the second Ethernet device using the PTP packet timestamp from the first Ethernet device, the final correction field value, and the transmission time from the first SFP device to the second SFP device. The clock is synchronized in accordance with the PTP/IEEE-1588 standard. In an alternate example, the correction field value is not adjusted by the transmission time while within the PON. The correction field value is adjusted by the difference between the egress time and the ingress time and represents the net time the packet was in the PON. The second Ethernet device synchronizes the clock using the PTP packet timestamp from the first Ethernet device and the final correction field value.

The process of timestamping and transmitting a PTP packet from the first Ethernet device to the second Ethernet device across the PON is continuously repeated in accordance with the synchronization timing standard from PTP/IEEE-1588.

The present technology allows time synchronization in disaggregated PONs with asymmetrical uplink and downlink transmissions. Due to a variable volume of network traffic, differing downlink and uplink transmission speeds, uplink scheduling, and jitter, the transmission of data across the PON experiences asymmetrical and variable delay that introduces phase error in the network. By determining the variable delay within the devices in the PON, the delay can be modeled as a constant delay that is updated in close to real-time to achieve time and phase synchronization in IPoEoF infrastructures.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples of the technology are described in detail.

FIG. 1 is a block diagram depicting a passive optical network ("PON") system 100, in accordance with certain examples. As depicted in FIG. 1, the PON system 100 comprises a clock 105, a PON section 110 configured to communicate with a network 99, and one or more endpoint devices ("EPD") 155-1 through 155-n.

In example embodiments, network 99 includes one or more wired or wireless telecommunications systems by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system that facilitates the communication of signals, data, and/or messages.

Network 99 functions as a telecommunication and Internet foundation network for the PON section 110. Network 99 provides access to other networks and services such as Internet Protocol ("IP") networks, video and audio over IP, cable television ("CATV"), and any other suitable networks to acquire Internet, data, audio, video, and voice services. For example, network 99 may be a network associated with an Internet service provider ("ISP"). Throughout the discussion of example embodiments, it should be understood that the terms "data" and "information" are used interchangeably herein to refer to text, images, audio, video, or any other form of information that can exist in a computer-based environment.

Clock 105 is a precision clock that provides timing signals to synchronize slave or client clocks, such as clocks 155-1 through 155-n, across a network. The timing signals are a component of a method to precisely synchronize devices across a network in accordance with Precision Time Protocol PTP/IEEE-1588 ("PTP"). Clock 105 may provide the functions of master clock 205, depicted in FIG. 2, by transmitting timing signals to Ethernet node 210 across network 99.

The PON section 110 is a fiber optic telecommunication-based technology that provides broadband network access in a point to multi-point topology. The PON section 110 may be an asynchronous transfer mode PON ("APON"), a broadband PON ("BPON"), an Ethernet PON ("EPON"), a gigabit Ethernet PON ("GE-PON" or "GPON"), or any other type of PON. The PON section 110 comprises an optical line terminal or termination ("OLT") device 120, one or more optical splitter devices 130-1 through 130-n, and one or more optical network unit ("ONU") devices 140-1 through 140-n.

OLT 120 is an endpoint hardware device in a PON. OLT 120 may be located at a central office. OLT 120 converts network traffic/data, received from network 99, from electrical signals to fiber optic signals to be used within the PON section 110. OLT 120 sends the converted data to one or more ONU 140 devices via optical splitters 130, initiates and controls the ranging process, and records the ranging information. OLT 120 provides downlink frame processing, wavelength division multiplexing, uplink frame processing, control signal generation, and a control means for controlling the downlink and uplink frame processing. OLT 120 comprises one or more components such as a central processing unit ("CPU"), a router, PON network cards, and voice gateway uplink cards.

OLT 120 comprises a clock 125. While depicted in FIG. 1 as a component of OLT 120, the clock 125 may be an external device to OLT 120 that is in communication with OLT 120. Clock 125 is a time of day ("ToD") clock that is synchronized with clocks 145-1 through 145-n. Clock 125 is not synchronized with clock 105 or clocks 155.

The PON section 110 comprises one or more optical splitter devices 130. Optical splitter 130 functions to divide the incoming fiber optic signal (or light) into two or more paths to direct the fiber optic signal from OLT 120 to one or more ONU 140 devices. The PON section 110 may support a split ratio of 1:32, 1:64, or 1:128 depending upon the type of PON. The split ratio may be achieved with one or more optical splitters 130. An optical splitter 130 may split the incoming fiber optic signal into 2, 4, 8, 16, 32, 64, or 128 paths. In an example, to achieve a split ratio of 1:64, optical splitter 130-1 may split the incoming fiber optic signal into 64 paths. In an alternate example, optical splitter 130-1 may split the incoming fiber optic signal into two paths. Each of the two paths may comprise an optical splitter 130-2 and 130-3 to further split each fiber optic signal into 32 paths to achieve the 1:64 split ratio. Any combination of optical splitters 130 may be used to achieve a desired split ratio within PON section 110.

The PON section 110 comprises one or more ONU 140 devices. ONU 140 may also be referred to as an optical network termination ("ONT") device. ONU 140 is the user side hardware in the PON section 110. ONU 140 receives fiber optic signals from OLT 120 and converts the fiber optic signals into electrical signals. The electrical signals are then transmitted to subscribers or consumers. ONU 140 can respond to ranging and control commands sent by OLT 120. ONU 140 can send, aggregate, and groom different types of data from the subscriber and send the data uplink to OLT 120. ONU 140 may cache the data and send the data uplink during a time window designated by OLT 120.

Each ONU 140 device comprises a clock 145. While depicted in FIG. 1 as a component of each ONU 140, each clock 145 may be an external device to each ONU 140 that is in communication with each ONU 140. Clock 145 is a time of day ("ToD") clock that is synchronized with clock 125. Clock 145 is not synchronized with clock 105 or clocks 155.

Each ONU 140 device may be in communication with an EPD 150. EPD 150 is an interface device that provides services associated with transmissions across PON section 110. EPD 150 may be any device suitable to receive a signal from an ONU 140 device and translate the signal for use by an endpoint customer or consumer. In an example, the signal may be an audio/video signal and the EPD 150 may be a computing device or television that displays the video and broadcasts the audio signal.

Each EPD 150 may comprise a clock 155. While depicted in FIG. 1 as a component of each EPD 150, each clock 155 may be an external device to each EPD 150 that is in communication with each EPD 150. Clock 155 may be referred to as a boundary, a slave, or a client clock. Clock 155 may have multiple network connections and may receive synchronization messages. In an example, clock 155 may function as a boundary clock or as a master clock, such as master clock 205. Clock 155 supports the PTP/IEEE-1588 timing standard.

Figure 2:
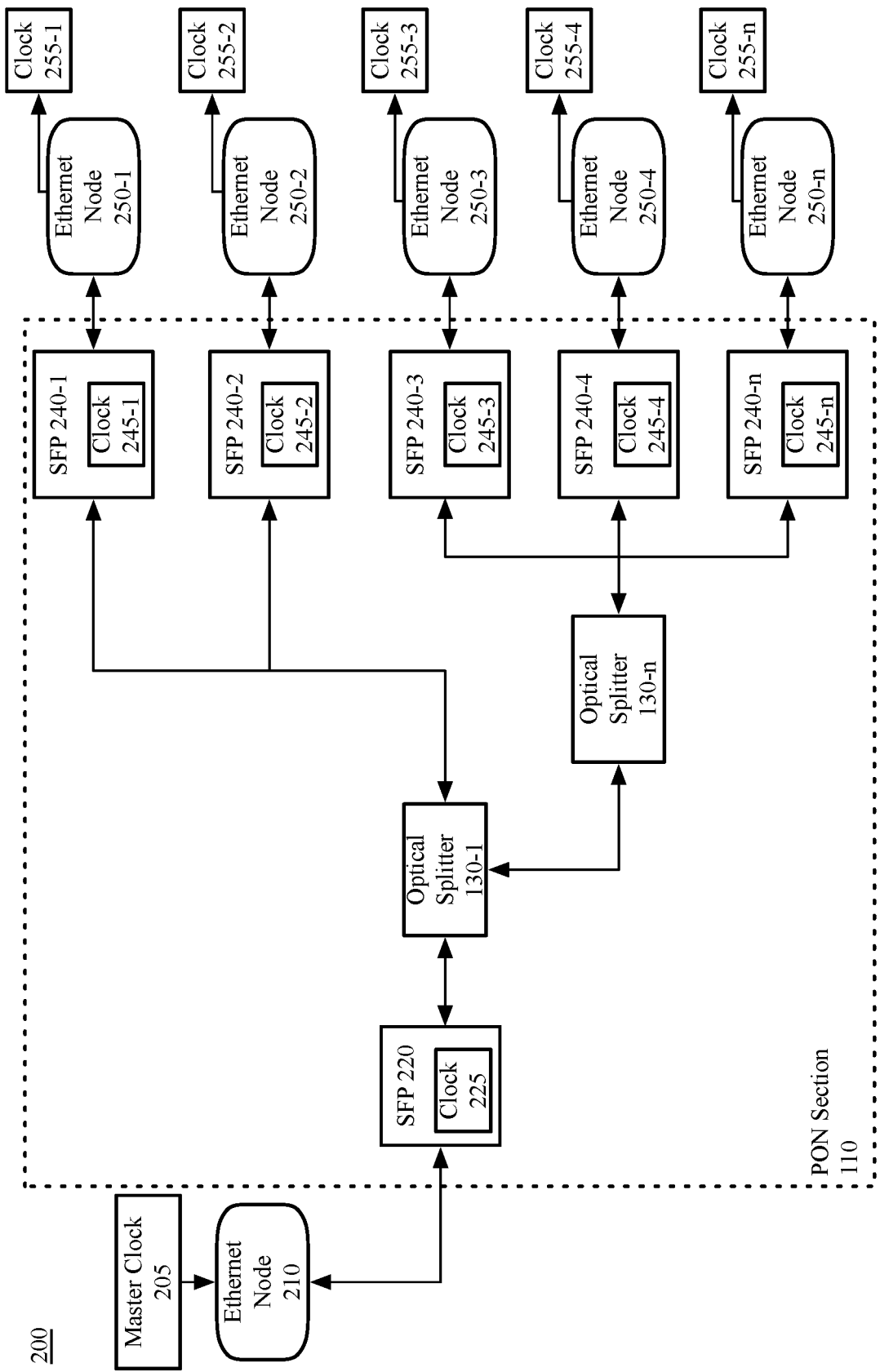
FIG. 2 is a block diagram depicting a disaggregated passive optical network system, in accordance with certain examples.

FIG. 2 is a block diagram depicting a disaggregated passive optical network ("PON") system 200, in accordance with certain examples. Disaggregated PON system 200 is an alternative architecture for PON system 100. Disaggregated PON system 200 comprises master clock 205, Ethernet node 210, small form-factor pluggable ("SFP") device 220, optical splitters 130-1 through 130-n, SFP devices 240-1 through 240-n, Ethernet nodes 250-1 through 250-n, and clocks 255-1 through 255-n.

Master clock 205 is a precision clock that provides timing signals to synchronize slave or client clocks, such as clocks 255-1 through 255-n, across a network. The timing signals are a component of a method to precisely synchronize devices across a network in accordance with Precision Time Protocol PTP/IEEE-1588 ("PTP"). Master clock 205 transmits timing signals to Ethernet node 210.

SFP PON system 200 comprises Ethernet node 210. Ethernet node 210 in connection with SFP 220 functions as a virtual OLT ("vOLT") device, such as OLT 120 previously described in reference to FIG. 1. While Ethernet node 210 and SFP 220 are depicted in FIG. 2 as separate components, in an alternate embodiment Ethernet node 210 and SFP 220 may be a single hardware component with functionality as described with respect to the separate components. In an example, Ethernet node 210 is a programmable router with hardware and software resources. Ethernet node 210 comprises hardware resources including a central processing unit ("CPU"), volatile and non-volatile memory, and interface ports. Ethernet node 210 has software features including, but not limited to, Layer 2; Layer 3; multi-protocol label switching ("MPLS"); segment routing; multicast; quality of service ("QoS"); timing with synchronous Ethernet; security; operations, administration, and maintenance ("OAM"); and manageability.

Disaggregated PON system 200 comprises a SFP 220 device. SFP 220 is a compact, hot-swappable, input/output transceiver used in telecommunication and data communication applications. SFP 220 comprises interfaces such that SFP 220 may communicate with devices such as switches, routers via fiber optic cables. SFP 220 may perform conversions between optical and electrical signals. For functionality as an OLT device, SFP 220 is connected to Ethernet node 210 via an interface port of Ethernet node 210. As depicted in FIG. 2, SFP 220 is connected to optical splitter 130 via a fiber optic cable. Optical splitters 130-1 through 130-n were previously described in reference to FIG. 1.

SFP 220 comprises a clock 225. While depicted in FIG. 2 as a component of SFP 220, clock 225 may be an external device to SFP 220 that is in communication with SFP 220. Clock 225 is a time of day ("ToD") clock that is synchronized with clocks 245-1 through 245-n. Clock 225 is not synchronized with clock 205 or clocks 255.

Disaggregated PON system 200 comprises one or more SFP 240 devices. SFP 240 is a compact, hot-swappable, input/output transceiver used in telecommunication and data communication applications. SFP 240 comprises interfaces such that SFP 240 may communicate with devices such as switches, routers via fiber optic cables. SFP 240 may perform conversions between optical and electrical signals. SFP 240 receives fiber optic signals from an optical splitter 130 via a fiber optic cable. For functionality as an ONU device, SFP 240 is connected to Ethernet node 250 via an interface port of Ethernet node 250. While SFP 240 and Ethernet node 250 are depicted in FIG. 2 as separate components, in an alternate embodiment SFP 240 and Ethernet node 250 may be a single hardware component with functionality as described with respect to the separate components.

SFP 240 comprises a clock 245. While depicted in FIG. 2 as a component of SFP 240, clock 245 may be an external device to SFP 240 that is in communication with SFP 240. Clock 245 is a time of day ("ToD") clock that is synchronized with clock 225. Clock 245 is not synchronized with clock 205 or clocks 255.

Disaggregated PON system 200 comprises one or more Ethernet node 250 devices. Each Ethernet node 250 in connection with a SFP 240 functions as a virtual ONU ("vONU") device, such as ONU 140 previously described in reference to FIG. 1. In an example, Ethernet node 250 is a programmable router with hardware and software resources. Ethernet node 250 comprises hardware resources including a central processing unit ("CPU"), volatile and non-volatile memory, and interface ports. Ethernet node 250 has software features including, but not limited to, Layer 2; Layer 3; multi-protocol label switching ("MPLS"); segment routing; multicast; quality of service ("QoS"); timing with synchronous Ethernet; security; operations, administration, and maintenance ("OAM"); and manageability. In an example, Ethernet node 250 may be a cloud-based virtual router deployed on a virtual machine.

Disaggregated PON system 200 comprises one or more clocks 255. Each Ethernet node 250 is in communication with a clock 255. Clock 255 may be referred to as a boundary, a slave, or a client clock. Clock 255 may have multiple network connections and may receive synchronization messages. In an example, clock 255 may function as a boundary clock or as a master clock, such as master clock 205. Clock 255 supports the PTP/IEEE-1588 timing standard.

Figure 6:
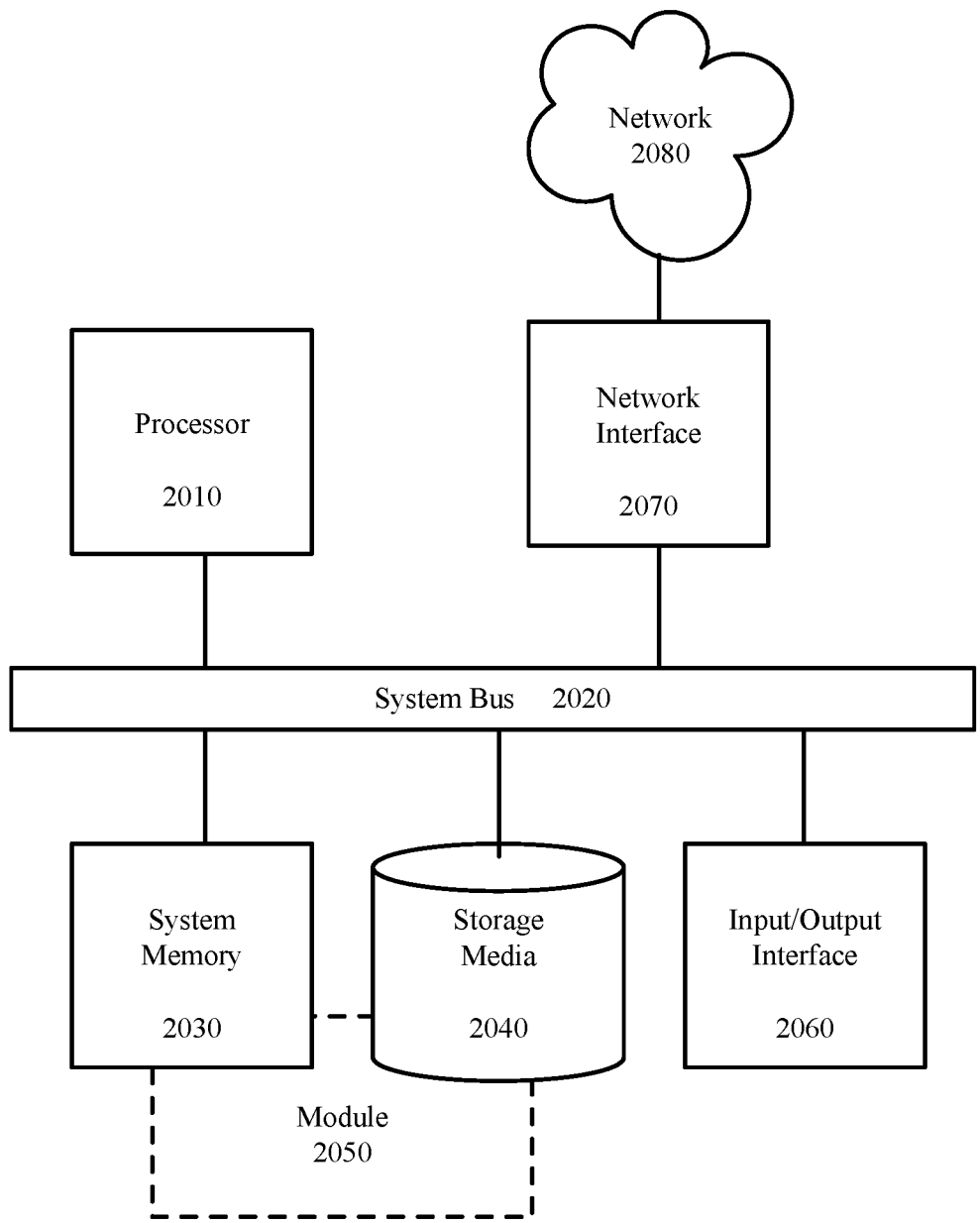
FIG. 6 is a block diagram depicting a computing machine and a module, in accordance with certain examples.

The network computing devices and any other computing machines associated with the technology presented herein may be any type of computing machine, such as, but not limited to, those discussed in more detail with respect to FIG. 6. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks. Each network may include various types of data or communications networks, including any of the network technology discussed with respect to FIG. 6.

Furthermore, any modules associated with any of these computing machines, such as modules described herein or any other modules (scripts, web content, software, firmware, or hardware) associated with the technology presented herein may be any of the modules discussed in more detail with respect to FIG. 6.

The network connections illustrated are examples and other means of establishing a communications link between the computers and devices can be used. Moreover, those having ordinary skill in the art having the benefit of the present disclosure will appreciate that the devices illustrated in FIG. 1 and FIG. 2 may have any of several other suitable computer system configurations.

Example Processes

Figure 3:
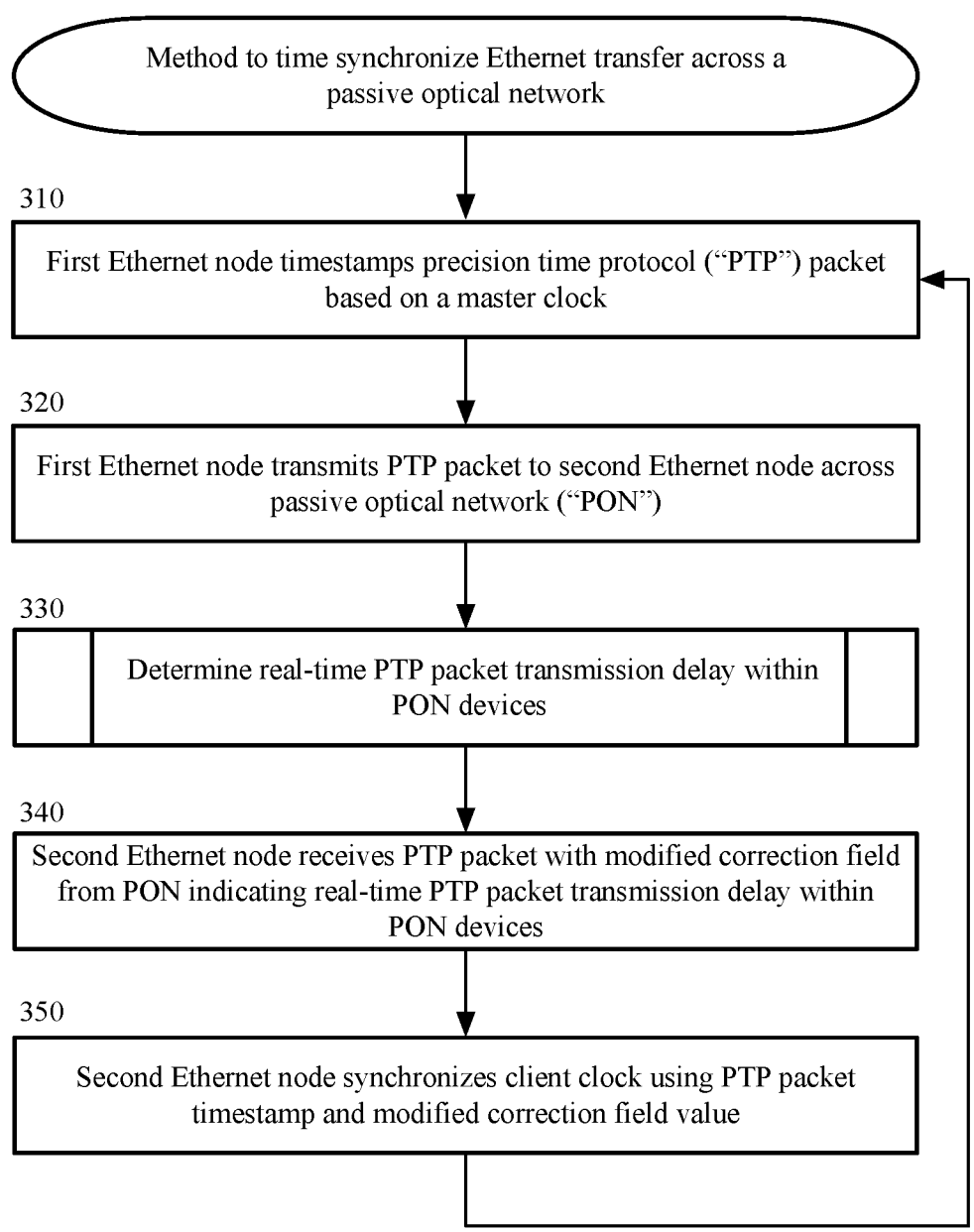
FIG. 3 is a block flow diagram depicting a method to time synchronize Ethernet transfer across a passive optical network, in accordance with certain examples.
Figure 4:
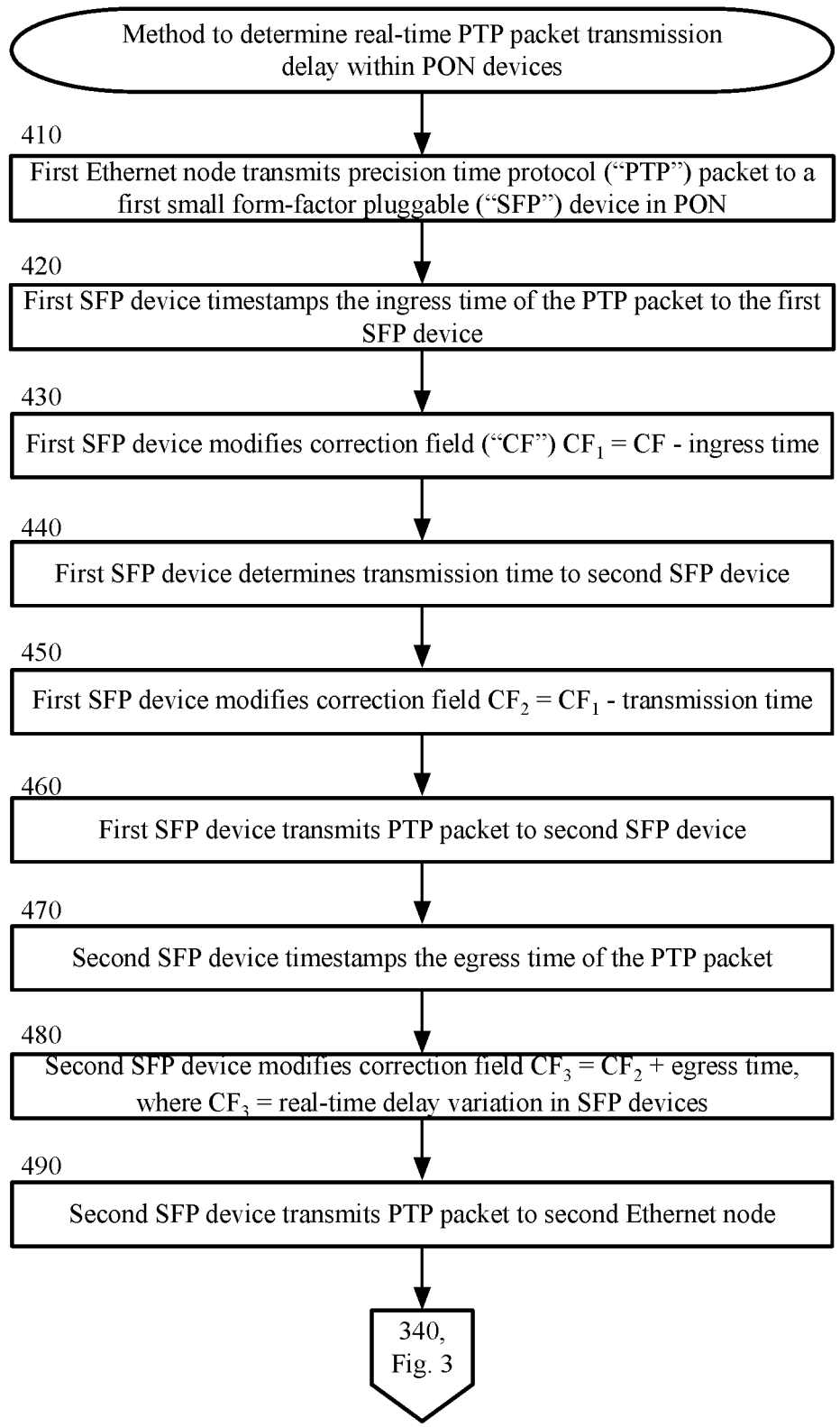
FIG. 4 is a block flow diagram depicting a method to determine real-time precision time protocol packet transmission delay within passive optical network devices, in accordance with certain examples.
Figure 5:
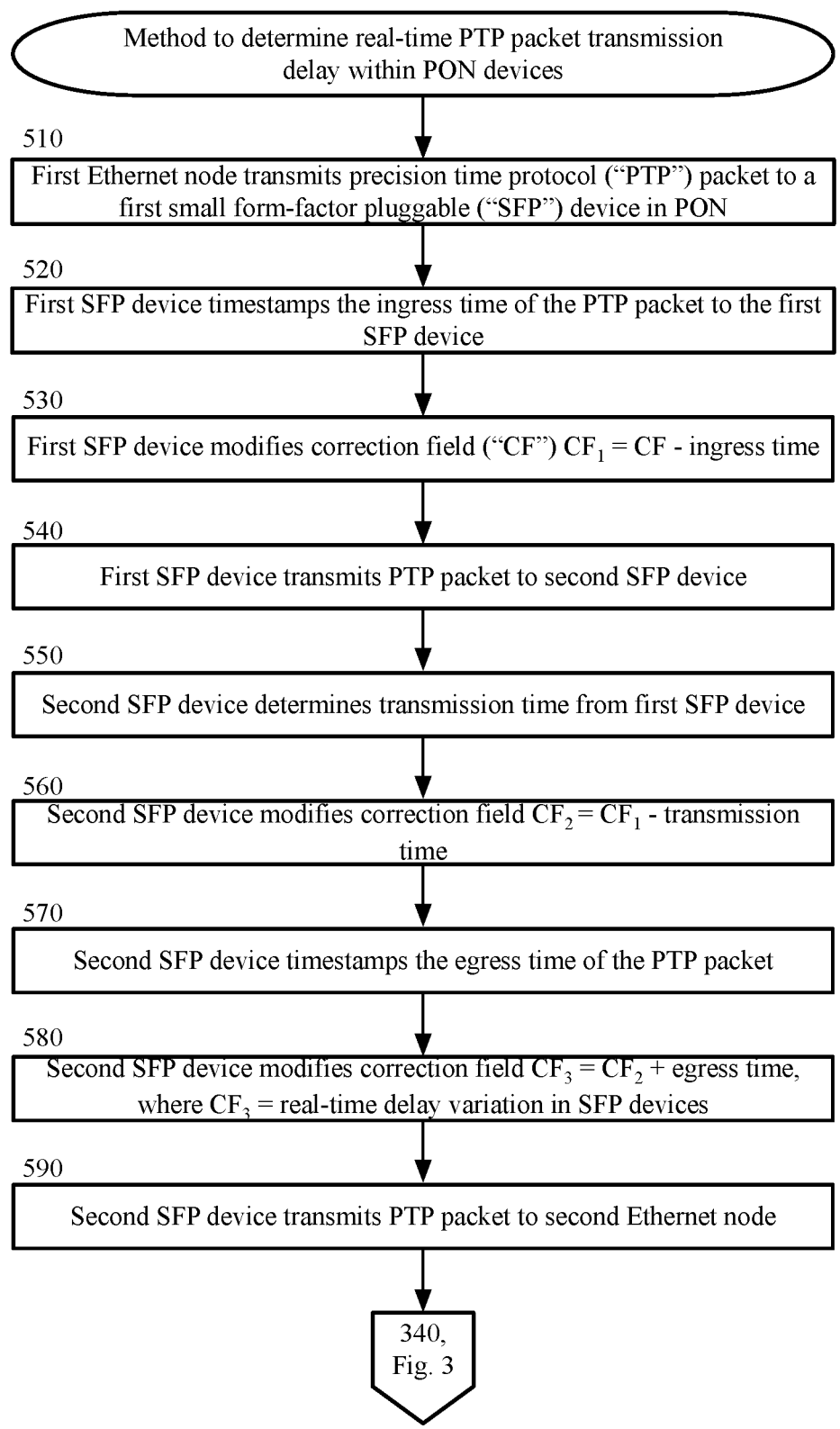
FIG. 5 is a block flow diagram depicting an alternate method to determine real-time precision time protocol packet transmission delay within passive optical network devices, in accordance with certain examples.

The methods illustrated in FIGS. 3 through 5 are described hereinafter with respect to the components of passive optical network ("PON") system 100 and disaggregated PON system 200. The methods of FIGS. 3 through 5 may also be performed with other systems and in other environments. The operations described with respect to FIGS. 3 through 5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

The methods of FIGS. 3 through 5 describe time synchronization of Ethernet transfer across a PON in a downlink direction, from an OLT device (Ethernet node 210/SFP 220) to an ONU device (Ethernet node 250/SFP 240). As communication across the PON is bidirectional, the methods of FIGS. 3 through 5 are also applicable in the uplink direction, from the ONU device to the OLT device.

The methods of FIGS. 3 through 5 describe time synchronization of Ethernet transfer across a PON between an OLT device and a particular ONU device. As the PON comprises multiple ONU devices, the methods of FIGS. 3 through 5 are concurrently applied to each of the ONU devices within the PON.

FIG. 3 is a block flow diagram depicting a method 300 to time synchronize Ethernet transfer across a PON, in accordance with certain examples. In an example, the Ethernet transfer across a PON is an Internet Protocol over Ethernet over Fiber ("IPoEoF") infrastructure with a disaggregated architecture as depicted in FIG. 2. The IPoEoF may be any one of an LTE, LTE-A, LTE-Pro, 5G, or similar wireless technology.

In block 310, a first Ethernet node 210 timestamps a precision time protocol ("PTP") packet based on master clock 205. In an example, the PTP packet is a PTP synchronization message in accordance with the PTP/IEEE-1588 timing standard. The PTP packet comprises a header, a body, and an optional suffix. The header is 34 bytes long and comprises transportSpecific, messageType, Reserved, versionPTP, messageLength, domainNumber, Reserved, Flags, correctionField, Reserved, sourcePortIdentity, sequenceID, controlField, and logMessageInterval fields. The body of the PTP packet comprises one or more fields to accept timestamps, such as an originTimestamp field. In an example, the first Ethernet node 210 timestamps the time of day that the PTP packet is transmitted to a second Ethernet node 250 in a timestamp field of the PTP packet. In an example, the timestamp is the time of day of master clock 205. In the continuing examples, times and timestamps are in 24-hour notation with microsecond or higher resolution. In an example, the first Ethernet node 210 timestamps the packet with the time 090000, representing that the packet was transmitted at 09 hours, 00 minutes, and 00 seconds. To achieve microsecond or higher resolution, additional digits of the timestamp may be used.

In block 320, the first Ethernet node 210 transmits the PTP packet to a second Ethernet node 250 across a PON section 110. The PTP packet is transmitted to achieve time and phase synchronization in the IPoEoF infrastructure.

In block 330, the real-time PTP packet transmission delay within the PON devices is determined. Block 330 is described in greater detail herein with respect to method 330 of FIG. 4.

FIG. 4 is a block flow diagram depicting a method 330 to determine real-time precision time protocol packet transmission delay within passive optical networks, in accordance with certain examples.

In block 410, the first Ethernet node 210 transmits the PTP packet to a first small form-factor pluggable ("SFP") device 220 in the PON section 110. The PTP packet is transmitted as an electrical signal. The first SFP device 220 functions as an OLT device of the PON section 110. In an alternate example, the first Ethernet node 210 transits the PTP packet to an OLT device 120 as depicted in FIG. 1.

In block 420, the first SFP device 220 timestamps an ingress time of the PTP packet to the first SFP device 220. In an example, the timestamp is stored in a field of the body of the PTP packet. In an alternate example, the timestamp is stored in a memory location of the first SFP device 220. Any suitable storage location for the timestamp may be used. In an example, the timestamp is the time of day of clock 225 embedded within or connected to the first SFP device 220. In the continuing example, the timestamp is 090010, representing that the packet was received at 09 hours, 00 minutes, and 10 seconds. As this example is provided for illustrative purposes, it should be expected that transmission times would be significantly less that integer units of seconds.

In block 430, the first SFP device 220 modifies the correction field of the PTP packet as the following: $CF_1$=CF−ingress time. CF represents an initial value stored in the correction field. In an example, the initial value is zero. In an alternate example, the correction field is initially blank or void of a value. $CF_1$ represents the modified value of the correction field. In the continuing example, the value of $CF_1$ is as follows: $CF_1$=0−090010=−090010.

In block 440, the first SFP device 220 determines the transmission time to a second SFP device 240. In the present example, the first SFP device 220 determines the transmission time to a particular second SFP device 240 of the one or more SFP devices 240, as the transmission time varies based upon the particular second SFP device of the one or more SFP devices 240. The transmission time may also be referred to as a ranging value or a ranging delay. In an example, the first SFP device 220 periodically measures and stores the transmission time to each of the one or more second SFP devices 250. In an alternate example, the transmission time is based on a distance measurement from the first SFP device 220 to the second SFP device 240. The distance measurement may be stored in a memory location of the first SFP device 220. The transmission time may be determined using an average fiber optic signal transmission speed multiplied by the distance measurement. In an example, the transmission time may be determined using a temperature compensated fiber optic transmission speed. The first SFP device 220 may be equipped to monitor an ambient temperature associated with the fiber optic cable of the PON section 110 to determine the temperature compensated fiber optic transmission speed. In an alternate example, the first SFP device 220 may comprise an application programming interface ("API") for use in acquiring the transmission time. Any other suitable method to determine or acquire the transmission time may be used. In the continuing example, the transmission time is determined to be 10 seconds.

In block 450, the first SFP device 220 modifies the correction field as the following: $CF_2$=$CF_1$−transmission time. $CF_1$ represents the previous value of the correction field and $CF_2$ represents the modified value of the correction field. In an alternate example, the first SFP device 220 combines the ingress time and the transmission time such that the correction field is modified in a single step (i.e., (−)ingress time−transmission time). In the continuing example, the value of $CF_2$ is as follows: $CF_2$=−090010−10=−090020.

In block 460, the first SFP device 220 transmits the PTP packet to the second SFP device 240. The second SFP device 240 functions as an ONU device of the PON section 110. To transmit the PTP packet, the first SFP device 220 converts the PTP packet from an electrical signal to a fiber optic signal. The first SFP device 220 transmits the PTP packet to the second SFP device 240 via one or more optical splitter devices 130, as illustrated in FIG. 2.

In block 470, the second SFP device 240 timestamps an egress time of the PTP packet from the second SFP device 240. In an example, the timestamp is stored in a field of the body of the PTP packet. In an alternate example, the timestamp is stored in a memory location of the second SFP device 240. Any suitable storage location for the timestamp may be used. In an example, the timestamp is the time of day of clock 245 embedded within or connected to the second SFP device 240. In the continuing example, the timestamp is 090040, representing that the packet was transmitted from the second SFP device 240 at 09 hours, 00 minutes, and 40 seconds.

In block 480, the second SFP device 240 modifies the correction field as the following: $CF_3$=$CF_2$+egress time, where $CF_3$=the real-time delay variation in the SFP devices 220 and 240. $CF_2$ represents the previous value of the correction field and $CF_3$ represents the current modified value of the correction field. In the continuing example, the value of $CF_3$ is as follows: $CF_3$=−090020+090040=000020.

The correction field is modified in blocks 430, 450, and 480. The correction field receives the following modifications in summary: $CF_f$=CF+egress time−ingress time−transmission time, where $CF_f$ represents the final value of the correction field and is equivalent to $CF_3$. The difference between the egress time and the ingress time represents the residence time of the PTP packet in the PON section 110. Subtracting the transmission time from the correction field removes the constant transmission time across the fiber optic cable. The final value of the correction field represents the real-time delay incurred in the SFP devices 220 and 240. In the continuing example, the delay incurred in the SFP devices 220 and 240 is 000020 or 20 seconds.

In block 490, the second SFP device 240 transmits the PTP packet to the second Ethernet node 250. The second SFP device 240 converts the PTP packet from a fiber optic signal to an electrical signal for transmission to the second Ethernet node 250. From block 490, the method returns to block 340 of FIG. 3.

FIG. 5 is a block flow diagram depicting an alternate method 330' to determine real-time precision time protocol packet transmission delay within passive optical network devices, in accordance with certain examples.

In block 510, the first Ethernet node 210 transmits the PTP packet to a first SFP device 220 in the PON section 110. The PTP packet is transmitted as an electrical signal. The first SFP device 220 functions as an OLT device of the PON. In an alternate example, the first Ethernet node 210 transits the PTP packet to an OLT device 120 as depicted in FIG. 1.

In block 520, the first SFP device 220 timestamps an ingress time of the PTP packet to the first SFP device 220. In an example, the timestamp is stored in a field of the body of the PTP packet. In an alternate example, the timestamp is stored in a memory location of the first SFP device 220. Any suitable storage location for the timestamp may be used. In an example, the timestamp is the time of day of clock 225 embedded within or connected to the first SFP device 220. In the continuing example, the timestamp is 090010, representing that the packet was received at 09 hours, 00 minutes, and 10 seconds. As this example is provided for illustrative purposes, it should be expected that transmission times would be significantly less that integer units of seconds.

In block 530, the first SFP device 220 modifies the correction field of the PTP packet as the following: $CF_1=CF-$ingress time. CF represents an initial value stored in the correction field. In an example, the initial value is zero. In an alternate example, the correction field is initially blank or void of a value. $CF_1$ represents the modified value of the correction field. In the continuing example, the value of $CF_1$ is as follows: $CF_1=0-090010=-090010$.

In block 540, the first SFP device 220 transmits the PTP packet to the second SFP device 240. The second SFP device 240 functions as an ONU device of the PON section 110. To transmit the PTP packet, the first SFP device 220 converts the PTP packet from an electrical signal to a fiber optic signal. The first SFP device 220 transmits the PTP packet to the second SFP device 240 via one or more optical splitter devices 130, as illustrated in FIG. 2.

In block 550, the second SFP device 240 determines the transmission time to the first SFP device 240. The transmission time may also be referred to as a ranging value or a ranging delay. In an example, the transmission time is based on a distance measurement from the first SFP device 220 to the second SFP device 240. The distance measurement may be stored in a memory location of the second SFP device 240. The transmission time may be determined using an average fiber optic signal transmission speed multiplied by the distance measurement. In an example, the transmission time may be determined using a temperature compensated fiber optic transmission speed. The first SFP device 220 may be equipped to monitor an ambient temperature associated with the fiber optic cable of the PON section 110 to determine the temperature compensated fiber optic transmission speed. In an alternate example, the second SFP device 240 may comprise an application programming interface ("API") for use in acquiring the transmission time. Any other suitable method to determine or acquire the transmission time may be used. In the continuing example, the transmission time is determined to be 10 seconds.

In block 560, the second SFP device 240 modifies the correction field as the following: $CF_2=CF_1-$transmission time. $CF_1$ represents the previous value of the correction field and $CF_2$ represents the modified value of the correction field. In the continuing example, the value of $CF_2$ is as follows: $CF_2=-090010-10=-090020$.

In block 570, the second SFP device 240 timestamps an egress time of the PTP packet from the second SFP device 240. In an example, the timestamp is stored in a field of the body of the PTP packet. In an alternate example, the timestamp is stored in a memory location of the second SFP device 240. Any suitable storage location for the timestamp may be used. In an example, the timestamp is the time of day of clock 245 embedded within or connected to the second SFP device 240. In the continuing example, the timestamp is 090040, representing that the packet was transmitted from the second SFP device 240 at 09 hours, 00 minutes, and 40 seconds.

In block 580, the second SFP device 240 modifies the correction field as the following: $CF_3=CF_2+$egress time, where $CF_3=$the real-time delay variation in the SFP devices 220 and 240. $CF_2$ represents the previous value of the correction field and $CF_3$ represents the current modified value of the correction field. In an alternate example, the second SFP device 240 combines the transmission time and the egress time such that the correction field is modified in a single step (i.e., egress time−transmission time). In the continuing example, the value of $CF_3$ is as follows: $CF_3=-090020+090040=000020$.

The correction field is modified in blocks 530, 560, and 580. The correction field receives the following modifications in summary: $CF_f=CF+$egress time−ingress time−transmission time, where $CF_f$ represents the final value of the correction field and is equivalent to $CF_3$. The difference between the egress time and the ingress time represents the resident time of the PTP packet in the PON section 110. Subtracting the transmission time from the correction field removes the constant transmission time across the fiber optic cable. The final value of the correction field represents the real-time delay incurred in the SFP devices 220 and 240. In the continuing example, the delay incurred in the SFP devices 220 and 240 is 000020 or 20 seconds.

In block 590, the second SFP device 240 transmits the PTP packet to the second Ethernet node 250. The second SFP device 240 converts the PTP packet from a fiber optic signal to an electrical signal for transmission to the second Ethernet node 250. From block 490, the method returns to block 340 of FIG. 3.

Returning to block 340 of FIG. 3, the second Ethernet node 250 receives the PTP packet with the modified correction field from the PON section 110 indicating real-time PTP packet transmission delay within PON devices 220 and 240.

In block 350, the second Ethernet node 250 synchronizes a clock 255 using the PTP packet timestamp from the first Ethernet node 210, the final correction field value, and the transmission time from the first SFP device 220 to the second SFP device 240. The clock 255 is synchronized in accordance with the PTP/IEEE-1588 standard.

In an alternate example, the correction field is not modified with the transmission time by either the first SFP device 220 or the second SFP device 240 while the packet is in the PON section 110. The correction field is modified, as previously described, with the ingress time to the first SFP device 220 and the egress time from the second SFP device 240. The correction field is modified as $CF_1=CF-$ingress time and $CF_2=CF_1+$egress time, such that the final value of the correction field represents the net time that the packet was resident in the PON section 110 as opposed to the real-time delay incurred in the SFP devices 220 and 240. The second Ethernet node 250 synchronizes the clock 255 using the PTP packet timestamp from the first Ethernet node 210 and the final correction field value. The clock 255 is synchronized in accordance with the PTP/IEEE-1588 standard.

From block 350, the method 300 returns to block 310. The method 300 continues to loop from block 350 back to block 310 to time synchronize Ethernet transfer across the PON section 110 in real-time.

The methods of FIGS. 3 through 5 apply to alternate network architectures in addition to the architecture depicted in FIG. 2. In the examples of FIGS. 3 through 5, the disaggregated PON system 200 is instantiated with SFP devices. In alternate examples, the disaggregated PON system 200 may be instantiated with Field-Programmable Gate Array ("FPGA") devices or any other suitable device to function as an OLT or ONU device. The PON section 110 may be disaggregated from the Ethernet nodes 210 and 250. The PON may be a PON media access control ("MAC") network ("PON MAC") in an architecture where the Ethernet device and the PON MAC are within the same hardware or silicon. In this architecture, the Ethernet devices function as OLT or ONU devices, rather than separate, discreet devices. Any suitable architecture may be used for transmissions across a PON.

Other Examples

FIG. 6 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
communicating a packet between first and second computing devices in a network section, the network section being a separate portion of a network system;
determining a residence time of the packet within the first and second computing devices in the network section, the residence time based on a first section clock associated with the first computing device in the network section and a second section clock associated with the second computing device in the network section, the first and second section clocks being disassociated from first and second system clocks that are outside of the network section, wherein determining the residence time of the packet comprises:
by the first computing device:
  receiving, from a third computing device of the network system, the packet, the packet comprising a field;
  timestamping a first ingress time of the packet;
  determining a transmission time to the second computing device;
  modifying the field of the packet using the first ingress time and the transmission time; and
  transmitting the packet to the second computing device of the network section;
by the second computing device:
  timestamping a second egress time of the packet from the second computing device of the network section;
  modifying the field of the packet using the second egress time to result in a second modified field that indicates the residence time of the packet within the first and second computing devices in the network section; and transmitting the packet to a fourth computing device of the network system; and synchronizing the first and second system clocks based on the residence time of the packet within the first and second computing devices in the network section.

2. The method of claim 1, wherein the first computing device of the network section and the first third computing device of the network system are a single hardware component.

3. The method of claim 1, wherein the second computing device of the network section and the fourth computing device of the network system are a single hardware component.

4. The method of claim 1, wherein the field of the packet is a correction field.

5. The method of claim 1, wherein modifying the field by the first computing device comprises subtracting the first ingress time and the transmission time from a reference value to result in a first modification of the field.

6. The method of claim 5, wherein modifying the field comprises adding the second egress time to the first modification of the field.

7. The method of claim 6, wherein the first computing device of the network system timestamps the packet with a sending time of the packet indicating a time that the packet is transmitted from the first computing device of the network system to the fourth computing device of the network system via the first computing device of the network section.

8. The method of claim 7, comprising:
by the second computing device of the network system:
extracting the sending time from the packet;
extracting a second modification from the field of the packet; and
synchronizing the second system clock which is associated with the second computing device of the network system with the first system clock which is associated with the first computing device of the network system based on the extracted sending time, the extracted second modification, and the transmission time.

9. The method of claim 1, wherein the network section is a passive optical network.

10. The method of claim 1, wherein the network system is an Internet Protocol over Ethernet over Fiber ("IPoEoF") network system.

11. The method of claim 1, wherein the first computing device of the network section is an optical line terminal device.

12. The method of claim 1, wherein the first computing device of the network section is a small form-factor pluggable computing device connected to the second computing device of the network system.

13. The method of claim 1, wherein the second computing device of the network section is an optical network unit device.

14. The method of claim 1, wherein the second computing device of the network section is a small form-factor pluggable computing device connected to the first computing device of the network system.

15. The method of claim 1, wherein the first computing device of the network system and the second computing device of the network system are Ethernet devices.

16. The method of claim 15, wherein the Ethernet devices are routers.

17. The method of claim 1, wherein the packet is a precision time protocol ("PTP") synchronization message in accordance with PTP/IEEE-1588 timing standard.

18. A computer program product, comprising:
a non-transitory computer-readable medium having computer-readable program instructions embodied thereon that, when executed by a computing device, cause the computing device to:
communicate a packet between first and second computing devices in a network section, the network section being a separate portion of a network system;
determine a residence time of the packet within the first and second computing devices in the network section, the residence time based on a first section clock associated with the first computing device in the network section and a second section clock associated with the second computing device in the network section, the first and second section clocks being disassociated from first and second system clocks that are outside of the network section, wherein determining the residence time of the packet comprises:
by the first computing device:
receiving, from a third computing device of the network system, the packet, the packet comprising a field;
timestamping a first ingress time of the packet
determining a transmission time to the second computing device;
modifying the field of the packet using the first ingress time and the transmission time; and
transmitting the packet to the second computing device of the network section;
by the second computing device:
timestamping a second egress time of the packet from the second computing device of the network section;
modifying the field of the packet using the second egress time to result in a second modified field that indicates the residence time of the packet within the first and second computing devices in the network section; and
transmitting the packet to a fourth computing device of the network system; and
synchronize the first and second system clocks based on the residence time of the packet within the first and second computing devices in the network section.

19. A system, comprising:
a storage device; and
a processor communicatively coupled to the storage device, wherein the processor executes application code instructions that are stored in the storage device to cause the system to:
communicate a packet between first and second computing devices in a network section, the network section being a separate portion of a network system;
determine a residence time of the packet within the first and second computing devices in the network section, the residence time based on a first section clock associated with the first computing device in the network section and a second section clock associated with the second computing device in the network section, the first and second section clocks being disassociated from first and second system clocks that are outside of the network section, wherein determining the residence time of the packet comprises:
by the first computing device:
receiving, from a third computing device of the network system, the packet, the packet comprising a field;
timestamping a first ingress time of the packet
determining a transmission time to the second computing device;

modifying the field of the packet using the first ingress time and the transmission time; and transmitting the packet to the second computing device of the network section;

by the second computing device:

timestamping a second egress time of the packet from the second computing device of the network section;

modifying the field of the packet using the second egress time to result in a second modified field that indicates the residence time of the packet within the first and second computing devices in the network section; and transmitting the packet to a fourth computing device of the network system; and synchronize the first and second system clocks based on the residence time of the packet within the first and second computing devices in the network section.

\* \* \* \* \*